(12) United States Patent
Carosa et al.

(10) Patent No.: US 10,613,963 B2
(45) Date of Patent: Apr. 7, 2020

(54) INTELLIGENT PACKET ANALYZER CIRCUITS, SYSTEMS, AND METHODS

(71) Applicant: Protocol Insight, LLC, Breckenridge, CO (US)

(72) Inventors: Anthony Peter Carosa, Colorado Springs, CO (US); Ross Nelson, Breckenridge, CO (US)

(73) Assignee: Protocol Insight, LLC, Breckenridge, CO (US)

( * ) Notice: Subject to any disclaimer, the term of this patent is extended or adjusted under 35 U.S.C. 154(b) by 0 days.

(21) Appl. No.: 15/557,402

(22) PCT Filed: Mar. 11, 2016

(86) PCT No.: PCT/US2016/022190
§ 371 (c)(1),
(2) Date: Sep. 11, 2017

(87) PCT Pub. No.: WO2016/145405
PCT Pub. Date: Sep. 15, 2016

(65) Prior Publication Data
US 2018/0113779 A1    Apr. 26, 2018

Related U.S. Application Data

(60) Provisional application No. 62/131,807, filed on Mar. 11, 2015.

(51) Int. Cl.
G06F 13/26 (2006.01)
G06F 11/34 (2006.01)
G06F 11/36 (2006.01)
H04L 29/06 (2006.01)
H04L 12/26 (2006.01)
G06F 11/30 (2006.01)
G06F 13/42 (2006.01)

(52) U.S. Cl.
CPC ........ *G06F 11/349* (2013.01); *G06F 11/3027* (2013.01); *G06F 11/364* (2013.01); *G06F 11/3656* (2013.01); *G06F 13/4282* (2013.01); *H04L 29/06* (2013.01); *H04L 43/18* (2013.01); *H04L 43/50* (2013.01)

(58) Field of Classification Search
CPC .. H04L 43/18; H04L 29/0653; G06F 12/0815
USPC .......................................... 710/105; 370/257
See application file for complete search history.

(56) References Cited

U.S. PATENT DOCUMENTS 6,144,961 A * 11/2000 de la Salle ............. H04L 41/26
6,816,973 B1   11/2004 Gleichauf et al.
(Continued)

OTHER PUBLICATIONS

International Search Report, dated Jun. 3, 2016, for PCT/US2016/022190, 2 pages.

*Primary Examiner* — Titus Wong
(74) *Attorney, Agent, or Firm* — Seed IP Law Group LLP (57) ABSTRACT

An intelligent packet analyzer circuit is configured to capture traffic being communicated over a serial communications bus. The intelligent packet analyzer circuit is further configured to analyze the captured traffic to identify a type of transaction being communicated over the serial communications bus and to analyze the packets being communicated over the serial communications bus to determine whether the packets collectively form a valid transaction of the identified type.

8 Claims, 10 Drawing Sheets

(56) References Cited

U.S. PATENT DOCUMENTS

| | | | |
|---|---|---|---|
| 7,254,115 B1* | 8/2007 | Lakhanpal | H04L 43/18 370/257 |
| 7,426,738 B2* | 9/2008 | Deverill | G06F 11/3419 709/202 |
| 7,697,495 B2* | 4/2010 | Armstrong | H04W 24/08 370/241 |
| 7,843,951 B2* | 11/2010 | Spencer | H04L 47/2441 365/230.03 |
| 2003/0023901 A1* | 1/2003 | Hack | G06F 11/364 714/25 |
| 2003/0123484 A1* | 7/2003 | Harriman | H04L 29/0653 370/471 |
| 2005/0216637 A1* | 9/2005 | Smith | G06F 12/0815 710/305 |
| 2006/0233199 A1* | 10/2006 | Harriman | H04L 29/0653 370/469 |
| 2007/0237076 A1* | 10/2007 | Balandin | H04L 47/10 370/229 |
| 2011/0055921 A1* | 3/2011 | Narayanaswamy | H04L 63/1458 726/22 |
| 2011/0072185 A1* | 3/2011 | Pinto | G06F 3/0607 710/315 |
| 2011/0138096 A1* | 6/2011 | Radulescu | G06F 13/385 710/305 |
| 2013/0061099 A1* | 3/2013 | Radulescu | H04L 1/1858 714/708 |
| 2013/0232137 A1 | 9/2013 | Knott | |
| 2013/0347103 A1* | 12/2013 | Veteikis | H04L 43/04 726/22 |
| 2014/0280894 A1 | 9/2014 | Reynolds et al. | |

\* cited by examiner

| UniPro State | UniPro link startup events |
|---|---|
| Phase 0 | Initiate Link Startup Sequence with a PA_LM_LINKSTARTUP req packet. Initiate Phase 0 by sending continuous TRG_UPRO packets, from one or both directions. Continue sending TRG_UPRO packets and watch for a response TRG-UPRO from other direction. When TRG_UPRO response is received transition to Phase 0b. |
| Phase 0b | Send two TRG_UPRO packets and transition to Phase 1. |
| Phase 1 | Send TRG_UPR1 packets and watch for a response TRG_UPR1 from other direction. When TRG_UPR1 response is received send two TRG_UPR1 packets and transition to Phase 2. |
| Phase 2 | Reconfigure all available M-TXs and M-RXs and exit to Phase 3. |
| Phase 3 | Send TRG-UPR2 packets and watch for a response TRG_UPR2 from other direction. When TRG_UPR2 response is received transition to Phase 4. |
| Phase 4 | Send two TRG_UPR2 packets and transition to Phase 5. |
| Phase 5 | Initiate capabilities exchange, then downgrade and exit LSS. |

*Figure 6A*

| TV State machine Validators | TV State |
|---|---|
| Watch for initial TRG-UPR0 packet in any direction | Idle |
| Assume LSS initiation and transition to Phase 0 state when a TRG_UPR0 is observed in either direction | Phase 0 |
| Watch for a response TRG-UPR0 from other direction. When TRG_UPR0 response is received transition to Phase 0b state. | Phase 0b |
| Watch for two TRG-UPR0 packets When two TRG-UPR0 packets observed transition to Phase 1 state. | Phase 1 |
| Watch for TRG-UPR1 packets in any direction Watch for a response TRG_UPR1 first direction, Watch for two response TRG_UPR1 from other direction, transition to Phase 2. | Phase 2 |
| Reconfigure all available M-TXs and M-RXs and exit to Phase 3 state. | Phase 3 |
| Watch for TRG_UPR2 packets [on Tx direction???] Watch for response TRG_UPR2 from other direction, transition to Phase 4. | Phase 4 |
| Watch for two TRG-UPR2 packets and transition to Phase 5 state. | Phase 5 |
| Watch for PACP-CAP Watch for downgrading and exit LSS | Success/Fail |

602: Assume LSS and evaluate for subsequence LSS states

604: Analyze all subsequent states for compliance to UniPro specification for Link Startup Sequence

| Trace Validation Results | | | |
|---|---|---|---|
| Test Results: drag a column here to group results | | | |
| Status | Test ID | Test Name | Rule |
| ⊙ | 2 | Link Startup Sequence | Start of ISS, Found first TRG-UPR0 DOWN |
| ⊙ | 2 | Link Startup Sequence | Found EOB after seeing TRG0 from other direction |
| ⊙ | 2 | Link Startup Sequence | Found TRG UPR1 transition to Phase 1 |
| ⊙ | 2 | Link Startup Sequence | Found first TRG_UPR1 Other Dir, moving to phase 2 |
| ⊙ | 2 | Link Startup Sequence | Found first TRG_UPR2, transitioning to Phase 3 |
| ⊙ | 2 | Link Startup Sequence | Found first TRG_UPR2 SecDir, moving to phase 4 |
| ⊙ | 2 | Link Startup Sequence | Found LOB other Dir |
| ⊙ | 2 | Link Startup Sequence | Found EOB, transitioning to Phase 5 |
| ⊙ | 2 | Link Startup Sequence | Found PACP CAP ind |
| ✗ | 2 | Link Startup Sequence | Found a packet that is not EOB, SOB, CAP ^_ind bef... |
| ✗ | 2 | Link Startup Sequence | Found a packet that is not EOB, SOB, CAP *_ind bef... |
| ⊙ | 2 | Link Startup Sequence | Found EOB, transitioning to DL initialization |
| ✗ | 2 | Link Startup Sequence | Found a packet that is not EOB, SOB, AFC before DI... |
| ✗ | 2 | Link Startup Sequence | Found a packet that is not EOB, SOB, AFC before DI... |
| ✗ | 2 | Link Startup Sequence | Found a packet that is not EOB, SOB, AFC before DI... |
| ✗ | 2 | Link Startup Sequence | Found a packet that is not EOB, SOB, AFC before DI... |
| ✗ | 2 | Link Startup Sequence | TIMEOUT did not find all 4 required AFCx packets f... |
| ✗ | 2 | Link Startup Sequence | Failed |

Test Cases Completed: 372    Passed: 0    Failed: 372    Timeout: 0

*Figure 9*

INTELLIGENT PACKET ANALYZER CIRCUITS, SYSTEMS, AND METHODS

CROSS REFERENCE TO RELATED APPLICATION

This application claims the benefit under 35 U.S.C. § 119(e) to U.S. Provisional Application No. 62/131,807 filed 11 Mar. 2015, which application is incorporated by reference herein in its entirety.

BACKGROUND

Technical Field

The present disclosure is directed generally to electronic test systems and more specifically to the testing of serial communications contained in electronic devices like smart phones.

Description of the Related Art

Electronic devices such as smart phones, digital cameras and other consumer electronic devices include a variety of components and a variety of communication buses interconnecting these components. For example, in a typical mobile platform of a smart phone an application processor is interconnected to mass storage in the form of flash memory devices. The application processor and flash memory devices are connected through a serial communications bus that implements a communication protocol or specification, which is typically the "Universal Flash Storage (UFS)" specification. This bus is accordingly typically referred to as a UFS bus (UFSB). The application processor and the flash memory devices communicate over the UFS bus through communications packets. These packets include header portions and payload portions. The header portion of a packet includes a variety of fields that define the type of packet being communicated and may also define various characteristics of the packet. The payload portion of a packet includes data being communicated through the packet.

When designing and troubleshooting electronic devices including serial communication buses like the UFS bus, a need arises during design and testing of such devices to ensure communication between the application processor and flash memory devices is functioning properly. This is true of other serial busses as well. A piece of test equipment known as a protocol analyzer is typically coupled to the UFS bus or other serial communications bus to capture packets being communicated over the bus and thereafter display information about the captured packets. This displayed information allows a test engineer or other personnel to trouble shoot the operation of the electronic device. There is a need for improved approaches to better assist a test engineer in troubleshooting operation of serial communications buses like the UFS bus.

BRIEF SUMMARY

In one embodiment of the present disclosure, an intelligent packet analyzer circuit is configured to capture traffic being communicated over a serial communications bus. The traffic includes command packets and response packets. The intelligent packet analyzer circuit is further configured to analyze the captured traffic to identify the types of command packets being communicated over the serial communications bus. The intelligent packet analyzer circuit also detects errors in the response packets after identifying the types of command packets. In one embodiment, the serial communications bus is a UFS bus.

DETAILED DESCRIPTION

Figure 1:
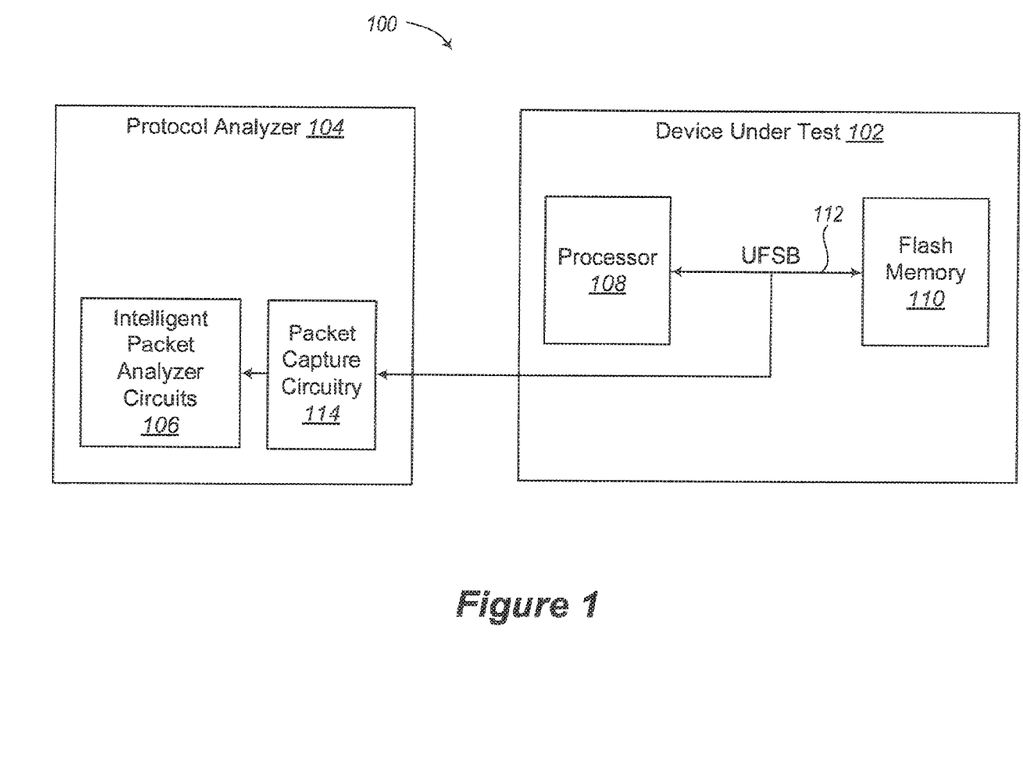
FIG. 1 is a functional block diagram of a test system including an electronic device being tested by a protocol analyzer including intelligent packet analyzer circuitry according to one embodiment of the present disclosure.

FIG. 1 is a functional block diagram of a test system 100 including an electronic device or device under test (DUT) 102 being tested by a protocol analyzer 104 that includes intelligent packet analyzer circuitry 106 according to one embodiment of the present disclosure. The DUT 102 includes an application processor 108 that communicates with flash memory 110 over a serial communications bus such as a UFS bus (UFSB) 112. In the protocol analyzer 104, packet capture circuitry 114 captures packets being communicated over the UFS bus 112 and supplies these captured packets to the intelligent packet analyzer circuitry 106. The intelligent packet analyzer circuitry 106 thereafter analyzes the captured packets and provides information about the captured packets through the protocol analyzer 104 to a user of the protocol analyzer, such as a test engineer.

In one embodiment, the intelligent packet analyzer circuitry 106 utilizes a rules engine to analyze the captured packets, which are predetermined or "known" packets being communicated over the UFS bus 112 during a test mode of operation. The intelligent packet analyzer circuitry 106 then provides information to the test engineer, typically through a video display (not shown) of the protocol analyzer 104, about the captured packets. In another embodiment, the packets being communicated over the UFS bus 112 are not predetermined or known in advance and the intelligent packet analyzer circuitry 106 first analyzes the captured packets to identify the type of captured packets and groups of packets, which are referred to as a "transaction," as will be discussed in more detail below. Once the intelligent packet analyzer circuitry 106 has identified the type of captured packet or sequence of packets, the circuitry again applies the rules engine to determine information about the captured packets and display this information to the test engineer. Each of these embodiments is discussed in more detail below with reference to FIGS. 2 and 3. In each of these embodiments the information about the captured packets includes the detection of errors in the packets or packet sequences. In this way the intelligent packet analyzer circuitry 106 detects errors and provides information about these errors to the test engineer to allow troubleshooting or verifying proper operation of the device under test 102.

In the present description, certain details are set forth in conjunction with the described embodiments to provide a sufficient understanding of the present disclosure. One skilled in the art will appreciate, however, that the embodiments may be practiced without these particular details. Furthermore, one skilled in the art will appreciate that the example embodiments described below do not limit the scope of the present disclosure, and will also understand that various modifications, equivalents, and combinations of the disclosed embodiments and components of such embodiments are within the scope of the present disclosure. Embodiments including fewer than all the components of any of the respective described embodiments may also be within the scope of the present disclosure although not expressly described in detail below. Finally, the operation of well-known components and/or processes have not been shown or described in detail below to avoid unnecessarily obscuring the present disclosure. Also, in the present description embodiments may be described generally in relation to a capturing and analyzing a packet. In addition to such operation on a packet, the disclosed embodiments may also capture and analyze a sequence or sequences of packets, as is mentioned in specific instances in the present description but which applies to all instances even though only expressly mentioned in these specific instances.

Figure 2:
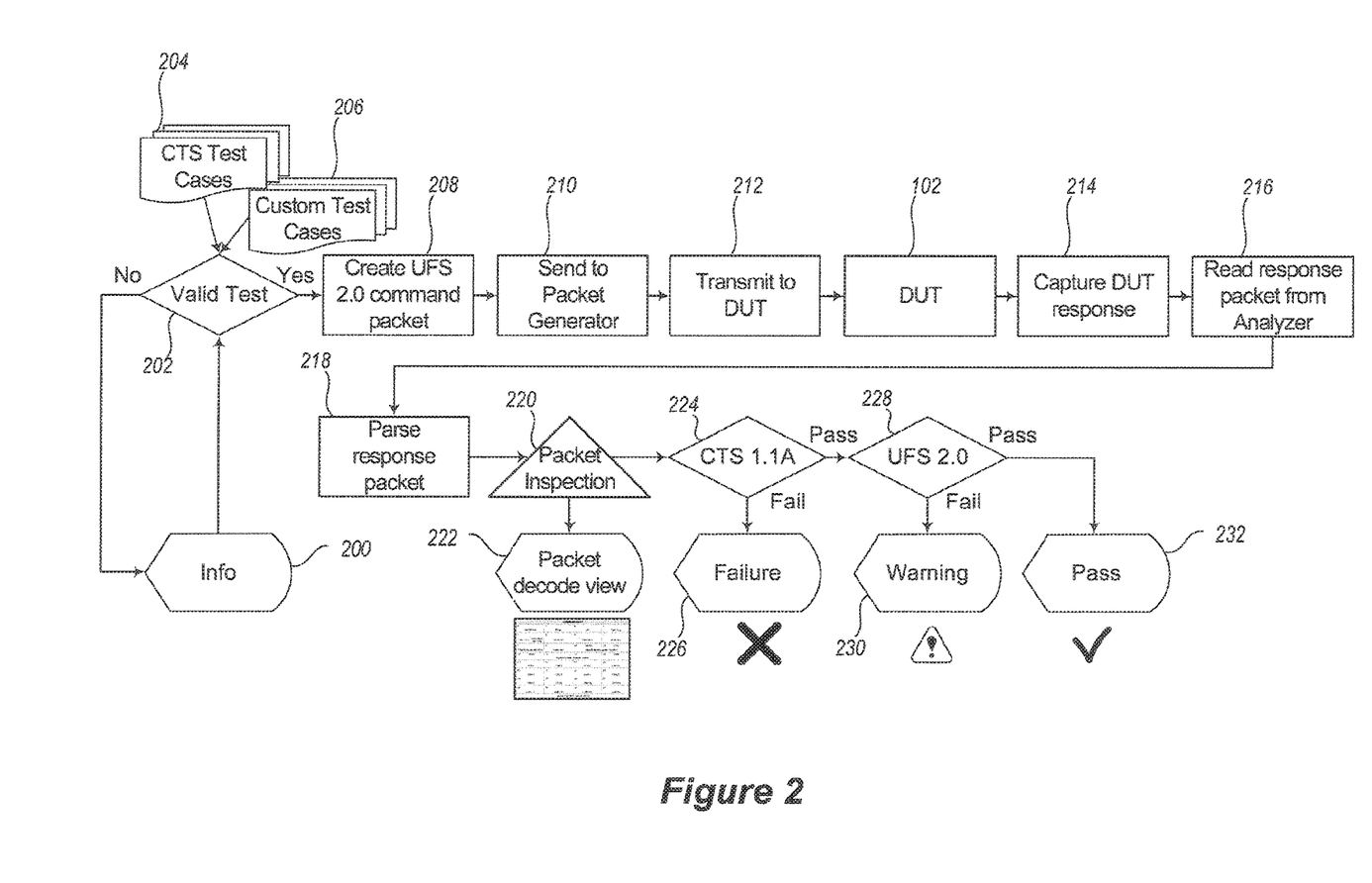
FIG. 2 is a flow diagram illustrating the operation of the intelligent packet analyzer circuitry of FIG. 1 according to a first embodiment where the packets being communicated over the UFS bus are known in advance.
Figure 3:
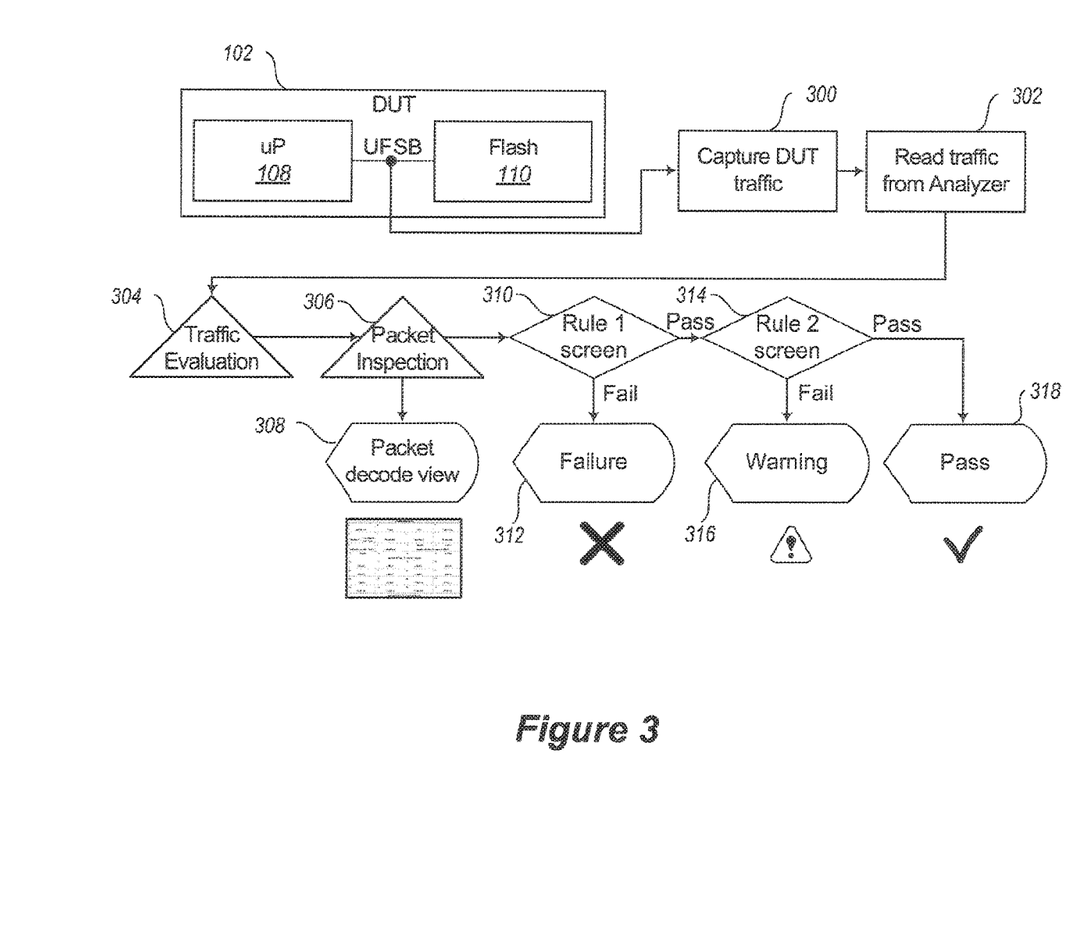
FIG. 3 is a flow diagram illustrating the operation of the intelligent packet analyzer circuitry of FIG. 1 according to a second embodiment where the packets being communicated over the UFS bus are not known in advance.

In the embodiments of the disclosure described herein with reference to FIGS. 1-3, the UFS bus 112 is used merely by way of example as the serial communications bus that is being monitored for the purposes of testing. Embodiments of the present disclosure are not limited to use in analyzing communications according to the UFS protocol on a UFS bus. Instead, embodiments may be utilized on any suitable type of serial communications bus, whether contained in a mobile platform or not. For example, a typical mobile platform includes a camera serial interface (CSI) and a display serial interface (DSI) between the application processor and a digital camera and visual display, respectively. These CSI and DSI interfaces are serial communications busses, and accordingly embodiments of the present disclosure may be applied to these and other such busses as well.

Furthermore, the serial communications busses to which embodiments of the present disclosure can be applied are not limited to busses between the application processor and another component. Embodiments may be applied to serial communications busses between any types of components within a mobile device, or even between mobile devices. The same is true of platforms other than mobile platforms, such as in computing platforms including serial communications busses between a microprocessor and various components, or between components in the computing platform. In sum, although the embodiments illustrated and described with reference to FIGS. 1-3 utilize the UFS protocol and UFS bus 112, embodiments of the present disclosure are not limited to this type of protocol or bus and may be applied other serial communications protocols and busses as well. The specific embodiments described herein and illustrated in the figures are provided as example embodiments of the present disclosure.

FIG. 2 is a flow diagram illustrating the operation of the intelligent packet analyzer circuitry 106 of FIG. 1 according to a first embodiment where the packets being communicated over the UFS bus 112 are predetermined or known in advance. This flow diagram will now be described in more detail with reference to FIGS. 1 and 2. In the embodiment of FIG. 2, the process executed by the intelligent packet analyzer circuitry 106 begins in step 200 in which the test engineer or other user supplies test configuration information through the protocol analyzer 104 regarding the type of tests to be performed on the device under test 102. From step 200 the process goes to step 202 and determines whether the information provided by the test engineer is valid. If the determination step 202 is negative, meaning the test engineer has not provided information corresponding to a valid test, the process goes back to step 200 and the test engineer is alerted regarding the failure and prompted to reconfigure the desired test with corrected test information, and the process would then again return to step 202 for validation of the corrected test information.

The valid tests that the test engineer may initiate include compliance test specification (CTS) tests 204 which are standard tests that may be performed on the UFS bus 112 according to the UFS specification. Alternatively, the test engineer may initiate customized tests 206 to be performed on the UFS bus 112. In this situation the test engineer may be prompted to input additional information regarding the custom tests to be performed. When the determination in step 202 is positive, meaning the test engineer has supplied information to select or define a valid test, the process then goes to step 208 and the intelligent packet analyzer circuitry 106 generates a command packet to be communicated to the device under test 102. From step 208 the process goes to step 210 and the intelligent packet analyzer circuitry 106 generates the command packet which, in turn, is supplied to the protocol analyzer 104 in step 212 and communicated to the device under test 102. Note that in this embodiment, the packet capture circuitry 114 of FIG. 1 may also perform the function of step 212 and thereby communicate or transmit the generated packet to the device under test 112.

The process continues in step 214 in which the protocol analyzer 104 captures on the UFS bus 112 the response packet of the device under test 102 that is generated in response to the supplied command packet. This operation corresponds to the function performed by the packet capture circuitry 114 of FIG. 1. In step 216, the intelligent packet analyzer circuitry 106 reads the captured response packet from step 214 and then proceeds to step 218 in which the response packet is parsed to identify information contained in the response packet. The process then proceeds from step 218 to step 220 and performs deep packet inspection of the parsed response packet. This deep packet inspection includes applying a rules engine to detect errors in the response packet, as will be described in more detail below. For example, in response to a known command packet a corresponding response packet or packets from the device under test 102 will be expected. Moreover, the values of particular fields within the response packet will also be known. Thus for a given known command packet the rules engine contains information for each field in the corresponding response packet and allows the intelligent packet analyzer circuitry 106 to examine these fields and detect errors in the response packet or packets.

The rules checker or engine uses conditions and compare fields to check the captured packet or transactions (i.e., groups of packets). The rules engine first determines if the packets or transaction (groups of packets) match the "conditions" of the test case, where the test case corresponds to the defined test to be performed as established step 204 or 206. If and only if the conditions pass then the rules engine checks the compare fields to determine if the packets or transaction pass the test case. The test case defines which bits of the packets or transactions are part of the conditions and compare fields. In order for the test case to proceed to the compare step, all conditions must all pass as true. If a condition fails then it is determined that the packet or transaction is not valid for this test case, which does not mean that the test case fails. If all the conditions pass, then the rules engine starts the compare fields phase. In the compare fields phase the rules engine determines if the test case passes or fails. If all the compare fields pass, then the test case passes. If any of the compare fields fail then the test case may fail or have warnings depending on an error level of the compare fields that failed.

An example is a test case to check a write packet. The conditions would be that the packet is a write packet, meaning that the header bits that define the type of command of the packet correspond to the bits for a write packet. Only once step 220 determines that the captured packet is a write packet does the rule engine proceed to the compare phase at which time the process checks or compares all the fields of the packet. Where transactions are being analyzed instead of packets, step 220 operates similarly to analyze the transaction.

The basic rules checker or engine utilized in step 220 includes two states or phases: 1) a conditions phase; and then 2) a compare phase. But this can become far more complex when defining test cases. The rules checker will apply a basic rules engine to a much more complex system. The rules engine allows a user to define a sequence of packets, thus the rules engine would become a complex set of state machines for checking transactions, where the state machines are based on the specific serial bus communications protocol being utilized (i.e., UFS in the present example). For example, in a test case that checks a write transaction in the UFS specification or protocol, there are three phases: 1) command phase; 2) data phase; and 3) response phase. So the test case may use one or more of the packets in this transaction for the conditions phase, and again only once the rule engine determines that all conditions are true will it move into the compare phase. While the rule checker is waiting to collect all the packets to satisfy the condition or compare fields and complete the test case, another write transaction may start. This means that the rules engine will need to check more than one instance of the test case. It could be possible for any number of the same test case to be running in parallel.

Furthermore the rules engine is designed in such a way that a user can easily define a test case that drives the rules engine. The user would be able to define the conditions and compare fields. For the compare fields the user can define if they are a failure or a warning if they do not match the received packet. The user could then take one test case and use it as part of a larger test case. For example the user might have a test case to check the write command packet, the data packet and the response packet individually. Then the user could create a test case that uses all three packets, rather than re-define the three packets the user could instantiate the three packets into the new test case. The user could then further refine the condition and compare fields for the instantiated test cases. This instantiated test case methodology could be repeated any number of times, thus allowing a user to quickly create very complex test cases. The user would also have other tools to create complex test cases. These tools could include logical operators, logical branching (e.g., like if-then statements), and use timers, thus allowing the user to create complex test cases that are very similar to a state machine.

In the embodiment of FIG. 2, the command packets sent to the device under test 102 are predetermined or known in advance, as previously mentioned. The rules engine accordingly includes rules for detecting errors in the response packets from the device under test 102 that are generated responsive to corresponding command packets supplied to the device under test. After deep packet inspection of the rules in step 220, the process goes to step 222 and displays on the protocol analyzer 104 information about the captured response packet for use by the test engineer. From step 220, the process also goes to step 224 and determines whether the response packet passes or fails a group of CTS conditions that correspond to the CTS tests 204 when those tests are selected. If the determination in step 224 is negative, this indicates that the response packet has failed the CTS test 204 and the process goes to step 226 and provides a failure indication to the test engineer that the response packet has failed the CTS conditions in step 224.

When a response packet passes all the CTS conditions in step 224, the process goes to step 228 and determines whether the response packet passes or fails a set of UFS test conditions associated with the UFS specification for the UFS bus 112. When the determination in step 228 indicates the response packet has failed one or more of the UFS test conditions, the process goes to step 230 and the test engineer is alerted through a suitable warning. If the determination in step 228 indicates the response packet has passed all the UFS test conditions, the process then goes to step 232 and indicates that the response packet has passed all the relevant tests and displays this information on the protocol analyzer 104 for use by the test engineer. The process performs the operations of 208-232 for each command packet sent to the device under test 102 and the corresponding response packet received from the device under test.

FIG. 3 is a flow diagram illustrating the operation of the intelligent packet analyzer circuitry 106 of FIG. 1 according to a second embodiment where the packets being communicated over the UFS bus 112 are not predetermined or known in advance. The embodiment of FIG. 3 will now be described in more detail with reference to FIGS. 1 and 3. In the embodiment of FIG. 3, the device under test 102 is initially placed into a test mode of operation by the test engineer. For example, although not shown in FIG. 1 the device under test 102 typically includes a test port, which may be a universal serial bus (USB) port and which the test engineer utilizes to send a command to the processor 108 and thereby control the processor to operate in a test mode of operation. The device under test 102 need not be placed into a test mode of operation for the process of FIG. 3 to be executed, but instead the device may simply be operating in a normal operating mode with the packet capture circuitry 114 capturing packets on the bus 112. The device under test 102 is assumed to be placed in a test mode of operation in the following description.

Once the test engineer has placed the device under test 102 in the test mode of operation, in step 300 the packet capture circuitry 114 of the protocol analyzer 104 captures the packets being communicated between the processor 108 and the flash memory 110 in the device under test 102. From step 300, the process then goes to step 302 and the intelligent packet analyzer circuitry 106 reads the captured packets from the packet capture circuitry 114. These captured packets correspond to all packets being communicated over the UFS bus 112 and not only the response packets as discussed above with regard to the embodiment of FIG. 2. Thus, these captured packets include command packets sent from the processor 108 to the flash memory 110 and response packets from the flash memory 110 to the processor 108, with these packets being collectively referred to as "traffic" in the flow diagram of FIG. 3.

From step 302 the process goes to step 304 and the intelligent packet analyzer circuitry 106 processes or analyzes the captured traffic to identify the type or types of packets being communicated over the UFS bus 112. In analyzing the captured traffic on the UFS bus 112, the intelligent packet analyzer circuitry 106 utilizes rules and information that correspond to the particular serial communications protocol being utilized on the particular serial communications bus being tested, which is the UFS bus 112 in the example being described. The intelligent packet analyzer circuitry 106 applies different rules and utilizes different information for analyzing traffic on different serial communications busses. For example, the intelligent packet analyzer circuitry 106 would utilize a first set of rules and information for analyzing traffic where the bus 112 is a UFS bus and a different set of rules and information where the bus 112 is a peripheral component interconnect (PCI) Express (PCIe) bus, for example. The rules and information for the desired serial communications bus 112 being analyzed are provided to the intelligent packet analyzer circuitry 106 prior to the analyzer beginning to analyze traffic on the bus.

In the embodiment of FIG. 3, although the protocol of the bus 112 is predetermined and thus known in advance by the intelligent packet analyzer circuitry 106, the packets being communicated over the UFS bus 112 are not predetermined or known to the intelligent packet analyzer circuitry 106 in advance. Thus, the intelligent packet analyzer circuitry 106 does not know in advance what command packets the processor 108 is sending over the UFS bus 112 to the flash memory 110. As a result, the intelligent packet analyzer circuitry 106 also does not know what response packets should be communicated over the UFS bus 112. Accordingly, in step 304 the process analyzes the captured traffic (i.e., the unknown packets being communicated over the UFS bus 112) to identify the likely type of command packet that is being communicated given the values for various fields of the captured packet along with the other captured traffic on the UFS bus 112. In making this determination, the intelligent packet analyzer circuitry 106 utilizes, in step 304, information for the UFS specification being implemented on the UFS bus 112, such as the structure of the packets, expected fields in the packets, values for those fields, and expected associated packets based upon an identified type of transaction associated with the packets, for example, as will be described in more detail below.

Once the process has determined in step 304 the type of command packets being communicated over the UFS bus 112, the process proceeds to step 306 and performs deep packet inspection of the corresponding response packets in the same way as described for step 220 in the embodiment of FIG. 2. More specifically, this deep packet inspection once again includes applying a rules engine for the serial communications protocol being used on the bus 112 (i.e., UFS in the present examples) to detect errors in the response packets. For example, in response to the determined type of command packet from the traffic evaluation in step 304, a corresponding response packet or packets from the device under test 102 will be expected. Moreover, the values of particular fields within the expected response packet will also be known just as before. Thus for a given known command packet the rules engine again contains information for each field in the corresponding response packet and allows the intelligent packet analyzer circuitry 106 to examine these fields and detect errors in the response packet or packets. The command packets and response packets may collectively define a transaction being executed on the UFS bus 112 and in this situation the intelligent packet analyzer circuitry 106 must also identify the type of the transaction as part of analyzing the captured packets, as will be described in more detail below with reference to FIG. 5.

Once again, the rules engine that is applied includes rules for detecting errors in the response packets from the device under test 102 that are generated responsive to corresponding command packets supplied to the device under test as determined in step 304. After deep packet inspection of the rules in step 306, the process goes to step 308 and displays on the protocol analyzer 104 information about the captured response packets for use by the test engineer. From step 306, the process also goes to step 310 and determines whether the response packet passes or fails a first set of rules or conditions that are defined for the detected type of command packet from step 304. If the determination in step 310 is negative, this indicates that the response packet has failed the first set of rules or conditions and the process goes to step 312 and provides a failure indication to the test engineer that the response packet has failed the conditions in step 310.

When a response packet passes all the first set of rules or conditions in step 310, the process goes to step 314 and determines whether the response packet passes or fails a second set of rules or conditions associated with the determined type of command packet from step 304. When the determination in step 314 indicates the response packet has failed one or more of the second set of rules or conditions, the process goes to step 316 and the test engineer is alerted through a suitable warning. If the determination in step 314 indicates the response packet has passed all the second set of rules and conditions as well, the process then goes to step 318 and indicates that the response packet has passed all the relevant tests and displays this information on the protocol analyzer 104 for use by the test engineer. The process of FIG. 3 performs the operations of 304-318 for all captured traffic on the UFS bus 112, and thus for each command packet identified in step 304 and the corresponding response packet or packets that are then analyzed in step 306. Typically, these command packets and response packets are associated with a particular transaction occurring over the DFS bus 112 and the rules and conditions are established by a state machine defining the transaction, as will be explained in more detail below with reference to FIGS. 5-8.

Figure 4:
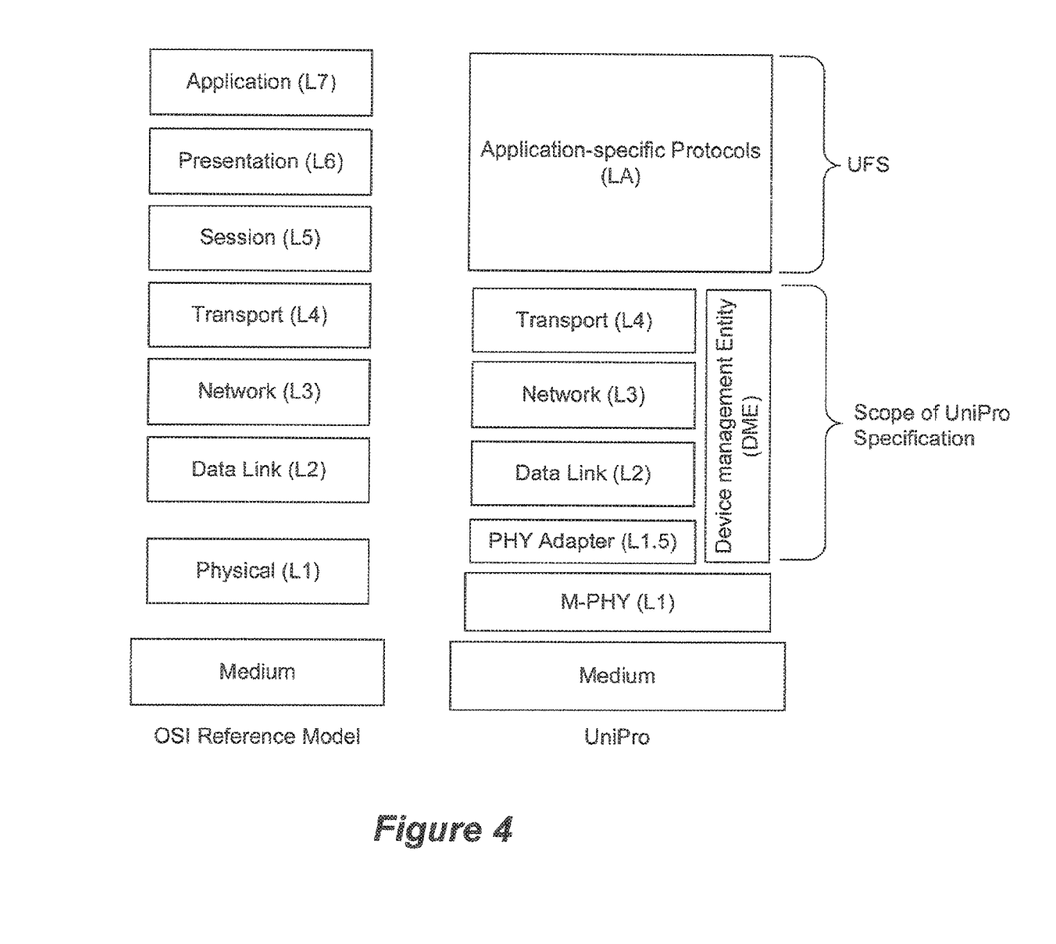
FIG. 4 is a diagram illustrating the relationship between the UFS bus and the Unified Protocol (UniPro) protocol stack of the UniPro interface and the standard Open Systems Interconnect (OSI) model.

Before describing the operation of the intelligent packet analyzer circuitry 106 in more detail, a common serial communications standard or protocol on the UFS bus 112 will first be described in more detail to provide additional context for the description intelligent packet analyzer operation to follow. Essentially every serial bus communications standard may be viewed as a series of state machines that collectively define the operation of the bus. One such standard is the Unified Protocol (UniPro) standard that may be used in combination with the UFS standard or specification as shown in FIG. 4, which is a diagram illustrating the relationship between the UniPro standard or interface and the standard Open Systems Interconnect (OSI) model. The OSI model will be understood by those skilled in the art and thus will not be described in detail herein. Briefly, the OSI model is a conceptual model that partitions a computer system into layers and characterizes the functions of each layer without regard to the underlying structure and technology of the layer. The OSI model is shown on the left in FIG. 4 as including seven layers L1-L7 along with a medium, which may be, for example, a copper or fiber optical cable, a radio frequency link, or a wireless link over which signals are communicated.

The right side of FIG. 4 shows how the UFS specification or standard and the UniPro specification or standard are implemented in the OSI model to form the UFS bus 112 of FIG. 1. The UFS specification is implemented in layer L5-L7 and UniPro specification in layers L1-L4 of the OSI model as illustrated. This illustrates the most common implementation of the UniPro specification as one of three serial standards used to connect two devices together in a smart phone. These three standards are the UFS standard, UniPro standard, and a standard associated with the physical layer M-PHY, and collectively form the UFS bus 112 of FIG. 1. As seen in the figure, the UFS standard is the application layer (i.e., layers L5-L7) serial communications protocol that provides the end functionality of transferring data into and out of memory to and from the application processor. The UFS protocol or standard rides on the UniPro protocol or standard in layers L1.5-L4 and functions as the link layer of the system that is responsible for managing link connectivity and controlling the physical layer M-PHY. Finally, the UniPro standard, in turn, rides on the physical layer M-PHY, which defines the characteristics of the signals being communicated over the medium.

The functionality of the UniPro protocol includes the establishment of links between devices. The link is a point-to-point communications channel that corresponds to the serial communications bus over which the devices communicate. Each link includes one or more lanes that may be configured separately to have respective operating characteristics, such as data transmission speed. The UniPro standard configures lanes and the operating characteristics of the lanes such as speed and also manages power attributes of the link and lanes, such as hibernate, sleep and off states for each lane. The UniPro standard also controls the integrity of data being communicated over the link and lanes thereof, such as the detection of data errors and the correction of such errors through data retransmission.

Each of these functions performed by the UniPro protocol operates according to or is controlled by a corresponding state machine that is part of the standard or protocol. Each such state machine then controls how a corresponding transaction or transactions occur on the bus, where a transaction is a sequence or group of packets that are communicated over the bus or link. A transaction includes one or more events, where an event is one or more packets corresponding to data or commands being communicated over the link. The events collectively correspond to a given transaction and an event may be viewed as the type of packet or packets being communicated. For example, a link startup sequence (LSS) is a type of transaction that occurs under the UniPro protocol to setup a link between two devices and define the characteristics of the link. A state machine defines the operation of such an LSS transaction, as will be discussed in more detail below with reference to FIGS. 6-8. There are many other such transactions, each defined by a corresponding state machine and which collectively define the operation of UFS bus 112 of FIG. 1. The intelligent packet analyzer circuitry 106 utilizes these state machines and the corresponding transactions and evens forming these transactions to analyze traffic on the UFS bus 112, as will now be described in more detail with reference to FIG. 5.

Figure 5:
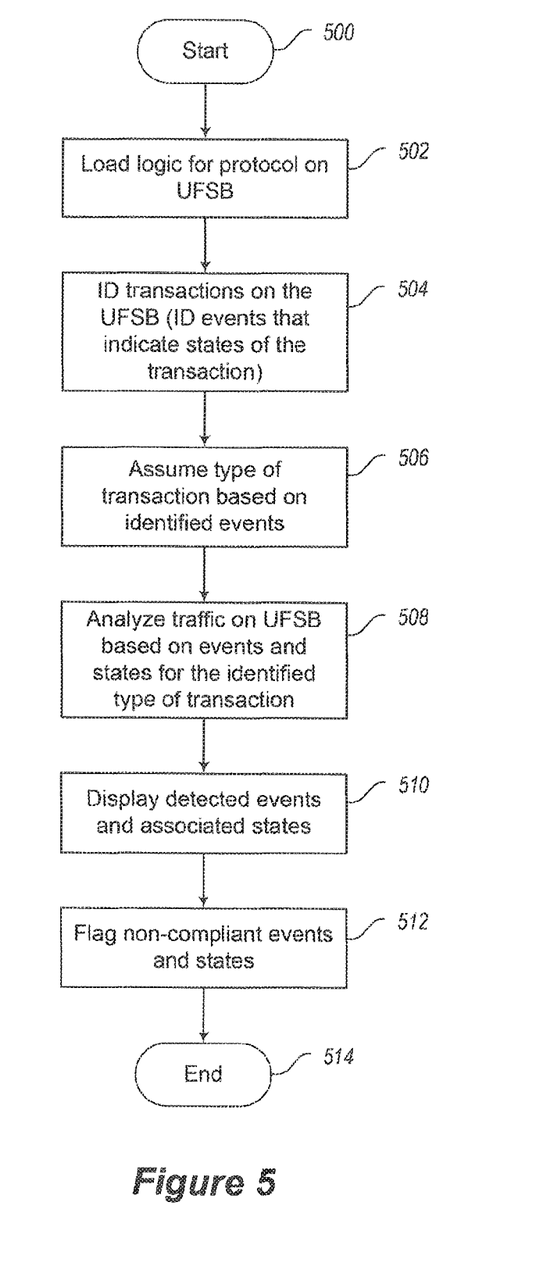
FIG. 5 is a flowchart illustrating the general operation of the intelligent packet analyzer of FIG. 1 in verifying the proper operation of a serial communications bus according to one embodiment of the present disclosure.

FIG. 5 is a flowchart illustrating the general operation of the intelligent packet analyzer circuitry 106 of FIG. 1 in verifying the proper operation of a serial communications bus according to one embodiment of the present disclosure. The process starts in step 500 and proceeds immediately to step 502, which represents the configuration of the intelligent packet analyzer circuitry 106 to analyze the particular serial communications protocol being implemented on the bus 112 being analyzed. As previously mentioned, the intelligent packet analyzer circuitry 106 must know (i.e., be configured to analyze) the protocol being utilized on the serial communications bus 112. The specific state machines and corresponding transactions will vary for different protocols, and thus the intelligent packet analyzer circuitry 106 must be properly configured to analyze the captured traffic on the bus 112. The example being described herein assumes the UFS bus 112 is formed by the UFS, UniPro, and a suitable M-PHY standard as previously discussed with reference to FIG. 4. As previously mentioned, however, the bus 112 may be formed by other suitable serial communications standards, such the PCI Express PCIe standard or USB standard. Thus, in step 502 the intelligent packet analyzer circuitry 106 configured to analyze captured traffic according to the specification or standard being utilized on the bus 112, which is the UFS, UniPro, and a suitable M-PHY standard as previously mentioned and as discussed with reference to FIG. 4.

From step 502 the process goes to step 504 and begins capturing traffic on the UFS bus 112 and analyzing this captured traffic to identify the type of transaction occurring on the UFS bus. More specifically, the intelligent packet analyzer circuitry 106 captures packets on the bus 112 and attempts to identify the type of event that corresponds to the captured packet or packets. From the identified type of event, the intelligent packet analyzer will then identify the type of transaction including that event which is occurring on the UFS bus 112. For example, a link startup request command packet (PA_LM_LINKSTARTUP.req) is a first event that occurs as part of a link startup sequence (LSS) transaction on the UFS bus 112. As previously mentioned, and LSS transaction occurs under the UniPro protocol to setup a link between two devices, where the two devices are the application processor 108 and flash memory 110 in the example embodiment of FIG. 1.

In this situation, when the intelligent packet analyzer circuitry 106 determines that the captured event is a link startup sequence request command packet the process proceeds to step 506 and the intelligent packet analyzer circuitry assumes the type of transaction occurring on the UFS bus 112 based on the type of captured event. For example, because the type of captured event is an LSS request event, the intelligent packet analyzer circuitry 106 assumes the transaction occurring on the UFS bus 112 is an LSS transaction. From step 506, the process then proceeds to step 508 and begins analyzing the traffic on the UFS bus 112 based on the assumed type of transaction occurring on the bus, which in the present example is an LSS transaction. As previously mentioned, a serial communications bus generally and more specifically the UniPro protocol that is being discussed in the present example may be viewed as being formed by a series of state machines, where each state machine defines a corresponding transaction or transactions. Accordingly, in step 508 the intelligent packet analyzer circuitry 106 captures events on the UFS bus 112 and then utilizes a state machine corresponding to an LSS transaction to analyze the captured events and determine whether each of the captured events is valid or invalid and whether the overall transaction is valid or invalid as well. An example of this type of operation by the intelligent packet analyzer circuitry 106 will be described in more detail with reference to FIGS. 6A and 6B.

From step 508 the process proceeds to step 510 and the intelligent packet analyzer circuitry 106 displays detected or captured events along with associated states for such events. Each such displayed captured event may be given an associated status indicator which indicates whether the event is a valid event as part of the assumed transaction being analyzed. These status indicators allow a test engineer or other user of the intelligent packet analyzer circuitry 106 to view what is occurring on the UFS bus 112 and determine whether the assumed transaction is occurring properly on the bus. The process then goes from step 510 to step 512 and flags non-compliant events and states through the status indicators. Once again, this allows a user of the intelligent packet analyzer circuitry 106 two note specific packets or events that are not proper as part of the transaction being analyzed. The operation of steps 510 and 512 will be described in more detail with reference to FIG. 9.

From steps 510 and 512, a user will be able to tell whether the assumed type of transaction occurring on the UFS bus 112 is executing properly over the bus. A non-compliant event or events will be flagged for review by the user. The process then proceeds to 514 and terminates. Although not expressly shown in the flowchart of FIG. 5, the process may next assume a different type of transaction where the initial type of transaction assumed in step 506 results in the analyzed traffic from step 508 and displayed results in steps 510 and 512 indicating that the overall transaction or significant portions of that transaction are invalid. For example, different transactions may be similar and thus the intelligent packet analyzer circuitry 106 may assume several different types of transactions and then analyze the corresponding events occurring on the UFS bus 112 for each assumed type of transaction.

Figure 6A:
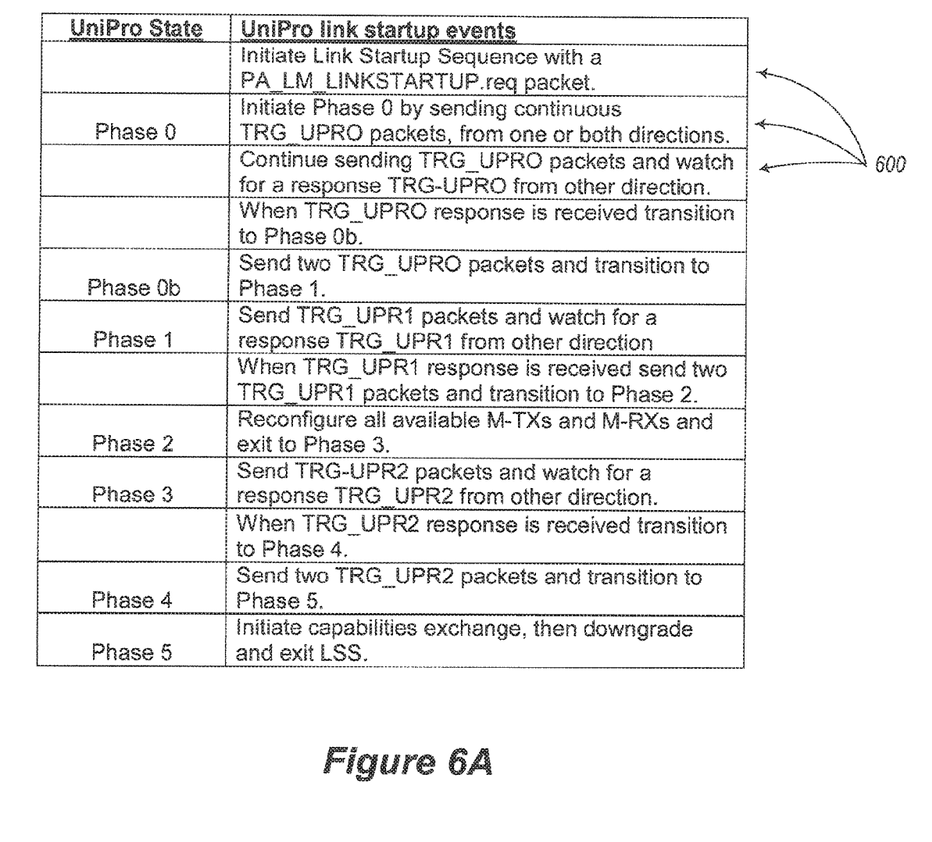
FIG. 6A is a diagram illustrating a sample transaction in the form of a link startup sequence (LSS) for a establishing a UniPro link in the UFS bus of FIG. 1.

FIG. 6A is a diagram illustrating a sample transaction in the form of a link startup sequence (LSS) for a establishing a UniPro link in the UFS bus 112 of FIG. 1. The left column illustrates particular phases or states of a UniPro LSS transaction while right column illustrates the event or events associated with each state in the left column. Thus, FIG. 6A effectively illustrates a state machine defining an LSS transaction occurring according to the UniPro protocol over the UFS bus 112 of FIG. 1. As discussed above, the LSS transaction is initiated with a PA_LM_LINKSTARTUP.req command packet and upon detection of such a packet or event, an LSS transaction is assumed and analysis of subsequent events on the UFS bus 112 begins in Phase0, which is a first state of the state machine defining the LSS transaction. The arrows 600 illustrate the first three events.

Figure 6B:
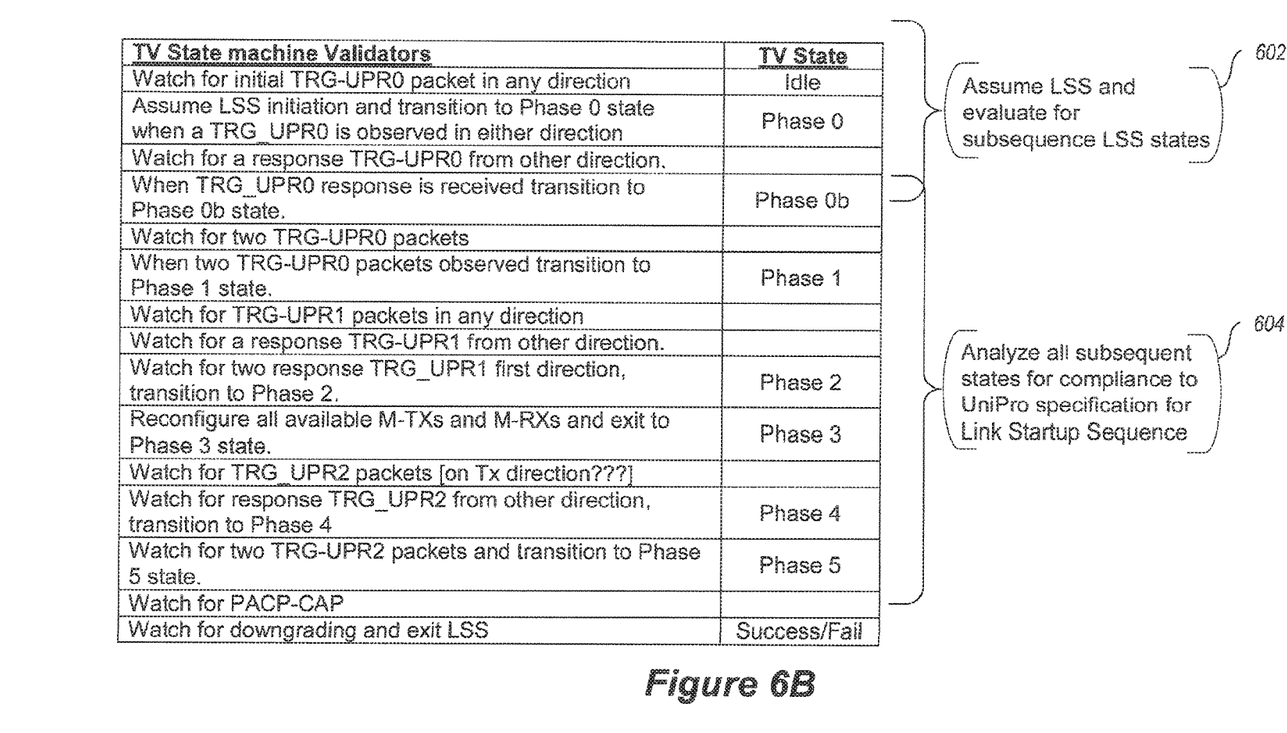
FIG. 6B is a diagram illustrating in more detail the operation of selected steps in the process of FIG. 3 when the LSS transaction of FIG. 6A is occurring on the UFS bus of FIG. 1.

FIG. 6B is a diagram illustrating in more detail the operation of selected steps in the process of FIG. 3 when the LSS transaction of FIG. 6A is occurring on the UFS bus 112 of FIG. 1. The column on the left indicates state machine validators which are events the intelligent packet analyzer circuitry 106 looks for as part of verifying a proper LSS transaction. The column on the right shows a corresponding state of the state machine utilized by the intelligent packet analyzer circuitry 106 in verifying the LSS transaction. Thus, the states forming the state machine in FIG. 6B correspond to the states that define a valid LSS transaction as defined by the state machine represented by FIG. 6A according to the UniPro standard. The analysis of the events by the intelligent packet analyzer circuitry 106 according to the state machine of FIG. 6B occurs over what is referred to as a "trace" and this overall process may be referred to as "trace validation (TV)." A trace is a time slice of a serial bit stream being communicated over the UFS bus 112 that is captured by the intelligent packet analyzer circuitry 106. Thus, in FIG. 6B the states of the state machine being utilized by the intelligent packet analyzer circuitry 106 are referred to as "TV State" in the right column in the state machine validators in the left column referred to as "TV State Machine Validators.)

As discussed above with reference to FIG. 6A, the LSS transaction is initiated with a PA_LM_LINKSTARTUP.req command packet and as seen in FIG. 6B the intelligent packet analyzer circuitry 106 assumes the start of an LSS transaction on the UFS bus 112 upon detection of the training sequence TRG_UPR0 events on the bus. The LSS transaction is assumed and analysis of subsequent events on the UFS bus 112 begins in Phase0, and this analysis of the initial state and initial events is illustrated as operation 602 in FIG. 6B. All subsequent states and associated events are then checked by the intelligent packet analyzer circuitry 106 as represented by the operation 604 in FIG. 6B to verify or not the execution of a proper LSS transaction on the UFS bus 112.

Where the intelligent packet analyzer circuitry 106 initially detects a different type of packet or event in lieu of the TRG_UPR0 packets or events, the intelligent packet analyzer circuitry assumes a different type of transaction is occurring on the UFS bus 112 and accordingly will utilize a different state machine in place of the state machine shown in FIG. 6B to analyze subsequent events and states on the UFS bus. The LSS transaction example of FIGS. 6A and 6B is presented merely by way of example to illustrate how the intelligent packet analyzer circuitry 106 utilizes detected packets or events on the UFS bus 112 and then a state machine associated with an assumed type of transaction occurring on the UFS bus to verify or not the occurrence of a valid transaction.

Figure 7:
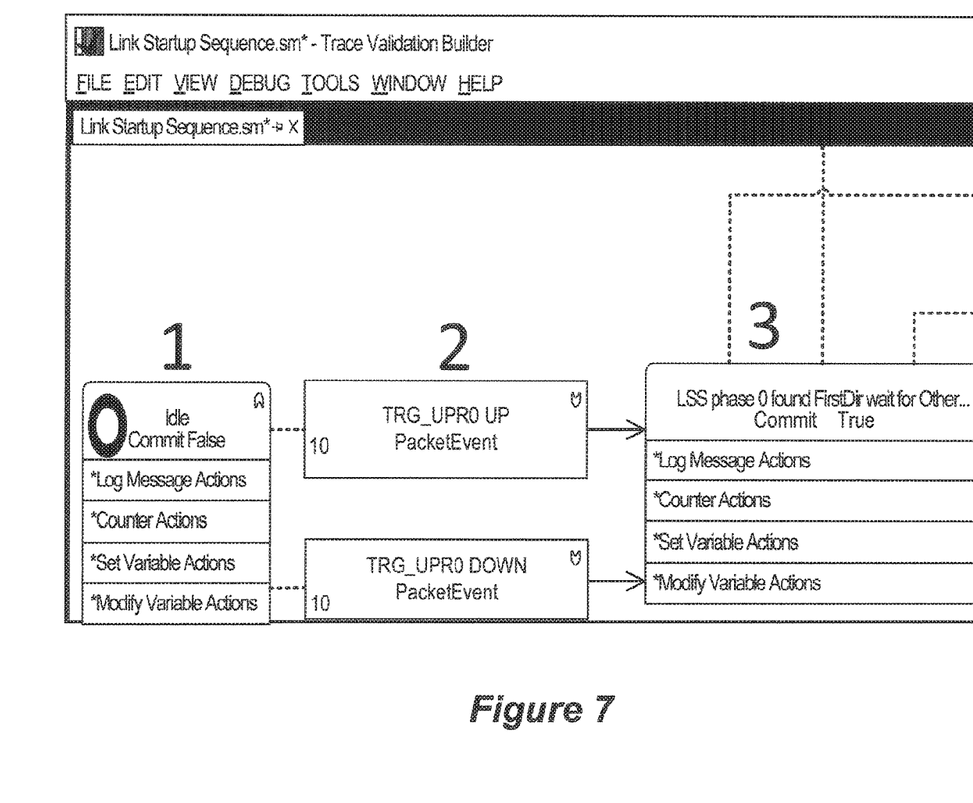
FIG. 7 is a screen shot illustrating the graphical user interface of the intelligent packet analyzer of FIG. 1 that allows a user to build the required logic to implement the trace validation state machine of FIG. 6B.
Figure 8:
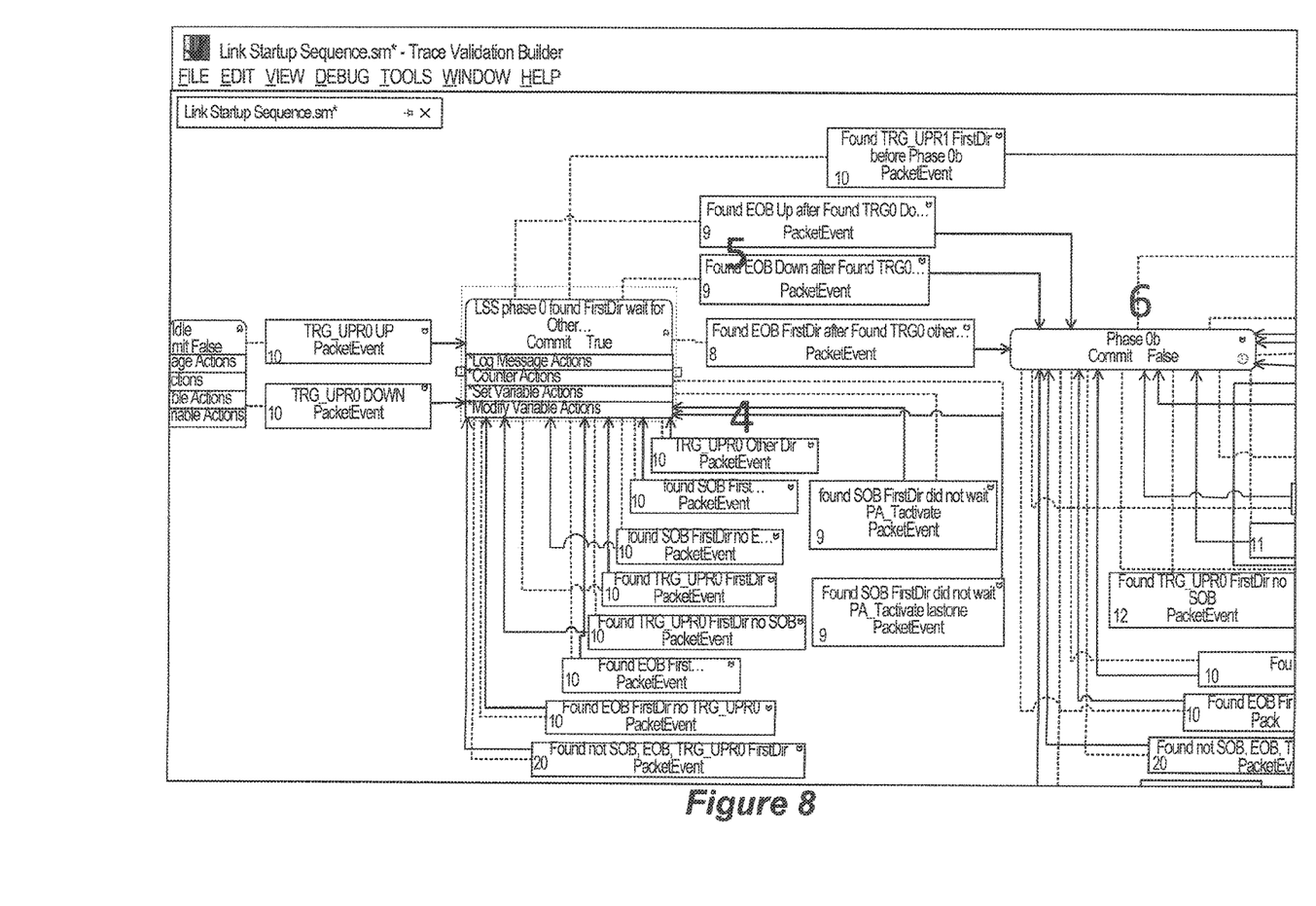
FIG. 8 is another screen shot of the graphical user interface of the intelligent packet analyzer of FIG. 1 showing a graphical representation of the logic of the trace validation state machine of FIG. 6B.

FIG. 7 is a screen shot illustrating the graphical user interface of the intelligent packet analyzer circuitry 106 of FIG. 1 that allows a user to build the required logic to implement the trace validation (TV) state machine of FIG. 6B. Different types of logic blocks are selected and combined through the graphical user interface to build the required TV state machine for analyzing a corresponding transaction over the UFS bus 112. The specifics of the type of logic blocks selected an interconnection of such logic blocks will of course depend upon the particular TV state machine being configured for use by the intelligent packet analyzer circuitry 106. As seen on the left in FIG. 7 an initial idle state logic block of the TV state machine is represented by the number 1 and then to the right to logic blocks represented by the number 2 are shown in correspond to logic blocks that detect the initial type of event as illustrated in FIG. 6B and as previously discussed. Thus, these two logic blocks designated with the number 2 function together to detect a TRG_UPR0 training sequence packet or event in either direction on the UFS bus 112. The logic block designated with the number 3 on the right of FIG. 7 then detects a TRG_UPR0 training sequence packet or event in the other direction, which is the next type of event and state as illustrated in the TV state machine of FIG. 6B. FIG. 8 is another screen shot of the graphical user interface of the intelligent packet analyzer circuitry 106 of FIG. 1 showing a graphical representation of more of the logic blocks, designated as numbers 4-6, and the interconnection of such blocks to form a second portion of the TV state machine of FIG. 6B.

Figure 9:
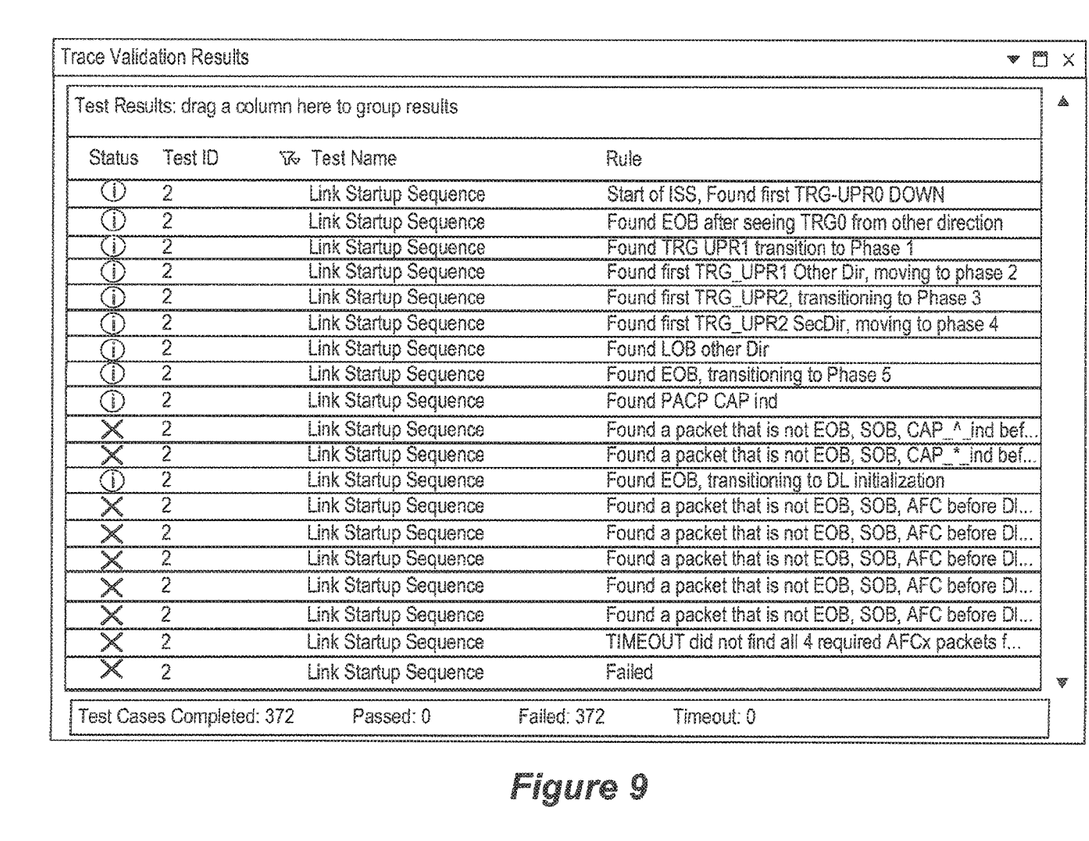
FIG. 9 is another screen shot of the graphical user interface of the intelligent packet analyzer of FIG. 1 showing a sample showing valid captured events and erroneous captured events of a UniPro link startup sequence transaction.

FIG. 9 is another screen shot of the graphical user interface of the intelligent packet analyzer of FIG. 1 showing valid captured events and erroneous or non-compliant captured events of the LSS transaction of FIGS. 6A, 6B, 7 and 8. FIG. 9 shows the displaying of detected events and associated states in step 510 and the flagging of non-compliant events and states in step 512 of FIG. 5. This screenshot represents one possible visual presentation of selected information for a user to utilize in analyzing the operation of the UFS bus 112. The visual representation shows in the far right column rules corresponding to events and states for an LSS transaction as previously discussed with reference to FIGS. 6A and 6B. Thus, the far right column essentially shows the captured events in the sequence of such events for traffic on the UFS bus 112 being analyzed according to the TV state machine for an LSS transaction.

In the far left column in FIG. 9 a status indicator is shown for the event of each row. For the first nine rows and the corresponding nine events, the circle for the status indicator indicates that the event is valid and has occurred in the proper state of the TV state machine. Conversely, in the $10^{th}$ and $11^{th}$ rows unexpected packets or events were detected and thus the status indicator is indicated with an "X" indicating that those two detected packets or events were not expected at least at that state of the TV state machine. A valid event is shown detected in row 12 followed by seven additional invalid events as indicated by the status indicator X for the final seven rows.

This visual presentation in FIG. 9 allows the user to examine and troubleshoot operation of the UFS bus 112. Moreover, the user can do so without knowing in advance what transactions are occurring on the UFS bus 112. Thus, a predetermined test sequence need not be supplied on the UFS bus to enable a user to trouble shoot the operation of the bus with the intelligent packet analyzer circuitry 106. Instead, the intelligent packet analyzer circuitry 106 need simply be coupled to the UFS bus 112 to monitor the traffic on that bus and configured according to the protocol being utilized on the bus. The intelligent packet analyzer circuitry 106 then analyzes transactions on the UFS bus 112 and provides feedback to the user about such transactions through the graphical user interface as represented by the visual representation example of FIG. 9. The graphical user interface of the intelligent packet analyzer circuitry 106 also includes a configuration portion as illustrated in FIGS. 7 and 8 that allows the user to program or configure the intelligent packet analyzer circuitry 106 to analyze the traffic on the UFS bus according to the particular protocol being utilized. The particular logic blocks and interconnection of such logic blocks as shown in the examples of FIGS. 7 and 8 are formed based on the particular protocol being utilized on the UFS bus 112.

One skilled in the art will understand that even though various embodiments and advantages of the present disclosure have been set forth in the foregoing description, the above disclosure is illustrative only, and changes may be made in detail, and yet remain within the broad principles of the invention. For example, components and operations described above with reference to FIGS. 1-3 may be implemented using either digital or analog circuitry, or a combination of both, and also, may be realized through software executing on suitable processing circuitry in the protocol analyzer 104. Therefore, the present disclosure is to be limited only by the appended claims.

The invention claimed is:

1. An intelligent packet analyzer circuit configured to:
analyze traffic being communicated over a serial communications bus;
assume, based on an analysis of one or more packets of the traffic, that the one or more packets correspond to a first type of transaction being communicated over the serial communications bus;
analyze a plurality of packets in the traffic to determine whether the plurality of packets and the one or more packets collectively form a valid transaction of the first type;
assume a different, second type of transaction in response to determining that the plurality of packets and the one or more packets collectively do not form a valid transaction of the first type; and
analyze the plurality of packets in the traffic to determine whether the plurality of packets and the one or more packets collectively form a valid transaction of the second type.

2. The intelligent packet analyzer circuit of claim 1, wherein the intelligent packet analyzer circuit is configured to analyze initially captured traffic to identify the types of these initially captured packets, and to thereafter identify the type of transaction based on the types of the initially captured packets.

3. The intelligent packet analyzer circuit of claim 2, comprising a plurality of state machines associated with a plurality of transaction types, respectively, the plurality of state machines including a first state machine configured to detect the first type of transaction and a second state machine configured to detect the second type of transaction, wherein the intelligent packet analyzer circuitry is further configured to utilize the first state machine to analyze the plurality of packets being communicated over the serial communications bus to determine whether the plurality of packets and the the one or more packets collectively form a valid transaction of the first type and utilize the second state machine to analyze the packets being communicated over the serial communications bus to determine whether plurality of packets and the one or more packets collectively form a valid transaction of the second type.

4. The intelligent packet analyzer circuit of claim 1, wherein the traffic includes command packets and response packets and wherein the intelligent packet analyzer circuit is further configured to detect the types of command packets and to detect errors in the response packets after detecting the types of command packets.

5. The intelligent packet analyzer circuitry of claim 1, wherein the serial communications bus comprises a Universal Flash Storage (UFS) bus utilizing a UFS protocol, a Unified Protocol (UniPro) protocol, and a physical layer protocol.

6. An intelligent packet analyzer circuit configured to:
capture traffic being communicated over a serial communications bus, the traffic including command packets and response packets;
identify events based on an analysis of one or more packets of the captured traffic;
assume that the identified events correspond to a first type of transaction;
flag one or more of the identified events as being non-compliant events of the first type of transaction;
assume that the identified events correspond to a different, second type of transaction in response to the flagged non-compliant events; and
analyze the identified events to determine whether the identified events form a valid transaction of the second type.

7. The intelligent packet analyzer circuit of claim 6, wherein the traffic includes Unified Protocol command and response packets.

8. A protocol analyzer, comprising:
packet capture circuitry configured to capture traffic being communicated over a serial communications bus; and
an intelligent packet analyzer circuit coupled to the packet capture circuitry to receive the captured traffic and the intelligent packet analyzer circuit configured to analyze the captured traffic and to assume a type of transaction being communicated over the serial communications bus based on the analyzed traffic, and further configured to analyze packets in the traffic to determine whether the packets collectively form a valid transaction of the assumed type, and to assume a different type of transaction in response to determining the packets collectively do not form a valid transaction;
wherein the intelligent packet analyzer circuit is further configured to analyze initially captured traffic to identify the types of these initially captured packets, and to thereafter identify the type of transaction based on the types of the initially captured packets; and
wherein the intelligent packet analyzer circuit further comprises a plurality of state machines, each state machine associated with a particular type of transaction and the intelligent packet analyzer circuitry further configured to utilize the state machine corresponding to the identified type of transaction to analyze the packets being communicated over the serial communications bus to determine whether the packets collectively form a valid transaction of the identified type.

* * * * *

UNITED STATES PATENT AND TRADEMARK OFFICE
CERTIFICATE OF CORRECTION

Page 1 of 1

PATENT NO. : 10,613,963 B2
APPLICATION NO. : 15/557402
DATED : April 7, 2020
INVENTOR(S) : Anthony Peter Carosa et al.

It is certified that error appears in the above-identified patent and that said Letters Patent is hereby corrected as shown below:

In the Specification

Column 11, Line 31:
"circuitry 106 two note specific packets"
Should read:
--circuitry 106 to note specific packets--.

In the Claims

Column 14, Claim 3, Line 51:
"the the one or more"
Should read:
--the one or more--.

Signed and Sealed this
Seventh Day of July, 2020

Andrei Iancu
*Director of the United States Patent and Trademark Office*